W. H. MURPHY.
Car-Axle.

No. 206,599. Patented July 30, 1878.

WITNESSES
C. W. Smith
D. C. Markham

INVENTOR
W. H. Murphy

UNITED STATES PATENT OFFICE.

WILLIAM H. MURPHY, OF SYRACUSE, NEW YORK.

IMPROVEMENT IN CAR-AXLES.

Specification forming part of Letters Patent No. 206,599, dated July 30, 1878; application filed May 8, 1878.

*To all whom it may concern:*

Be it known that I, WILLIAM H. MURPHY, of Syracuse, in the county of Onondaga and State of New York, have invented a new and useful Improvement in Car-Axles, which is fully set forth in the following specification and accompanying drawing—

Figure 1:
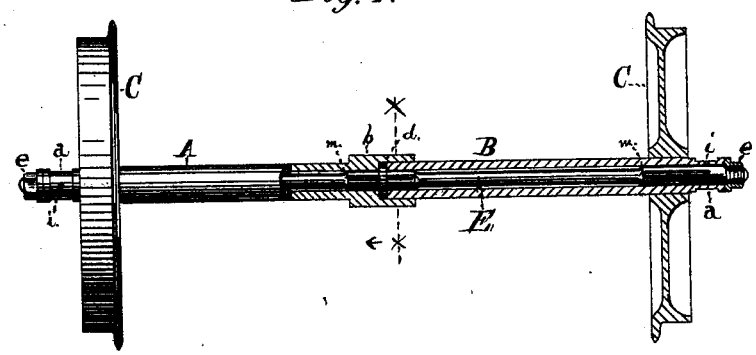
Figure 2:
Figure 3:

Figure 1 in which shows on the left an elevation, and on the right side a longitudinal sectional view for about half the length of a car-axle embracing my invention; Fig. 2, the axle-piece, of uniform diameter, showing the grooves for the oil; and Fig. 3, a cross-section on the line $x\ x$ of Fig. 1.

The object of my invention is to allow the wheels of cars to revolve upon the axle independently of each other, thereby reducing their friction upon the track when the car is going around a curve, where one wheel has a greater distance to travel than the other.

It consists in mounting the car-wheels, not upon the axle, but upon two independent hollow sleeves fitting over the axle, and supported, stiffened, and held together by it, and upon which they revolve.

It is constructed as follows: I make two long metallic tubular sleeves, A B, and upon the outer end of each I turn an ordinary axle-bearing, $a$. The axle-holes in the wheels $c\ c$ are made of proper size to allow the wheels to be mounted upon the sleeves just inside of the axle-bearing $a$ upon each sleeve, and in the same manner as car-wheels are mounted upon ordinary axles.

A shoulder, $b$, is made upon the inner end of one sleeve, and bored out so as to receive the inner end of the other sleeve, and thereby close the joint between them and exclude the dust and grit.

The sleeves A B are made of such length that when the inner ends are placed together, one within the shoulder upon the other, the distance between the treads of the two wheels will be the same as the gage of the road.

The axle-piece E is made of about the usual size and length in one piece, and without any bearings upon the ends, where shoulders are made and screw-threads cut, as shown in the drawings. In the center of this axle-piece a small collar, $d$, is formed or mounted, against which the inner ends of the sleeves will abut to prevent end movement of the sleeves and wheels upon the axle-piece E.

Nuts and washers $e$ are used upon the outer ends of the axle-piece, and when screwed up locked in any ordinary manner.

In putting the parts together the sleeves are pushed upon the axle-piece with their inner ends against the collar, and the nuts $e$ are screwed up tight against the shoulders back of the screw-threads and locked.

To lubricate the surface of the axle-piece and the bore of the sleeves, I drill a hole, $i$, in each of the bearings $a$, and cut one or more longitudinal grooves, $m$, on the axle-piece E each way from the collar $d$ nearly out to the ends, so that as the wheels revolve, carrying with them the sleeves, the oil in the boxes will lubricate the bearings of the sleeves, run through the holes $i$, and into and along the grooves $m$, and the sleeves revolving take up the oil from these grooves and distribute it around the axle-piece E.

If necessary to reduce the friction within the sleeves, this axle can be reduced in size in places, and thus the axle-piece will touch the surface of the bore of the sleeves only at a few points, with intervals between.

This style of axle-piece is shown in the drawings; but it may be of uniform diameter, if desired, as also shown.

Having thus described my device, what I claim as my invention, and desire to secure by Letters Patent, is—

1. The sleeve A, having an enlarged end, $b$, forming a receiving-socket for the end of the sleeve B and for the abutting shoulder $d$ on the solid axle, in combination with end lock-nuts $e$, whereby the meeting ends of the axle-sleeves form a lapping joint, which incloses the abutting shoulder, as and for the purpose specified.

2. The solid axle E, provided with surface-channels $m$, in combination with the sleeve-shafts A B, provided with lateral holes $i$ in the end bearing-surfaces $a$, as and for the purpose stated.

3. The above-described car-axle, composed of the solid axle-piece E, inserted within and supporting the hollow sleeves A B, the hollow sleeves A B, lock-nuts $e$, and lubricating-grooves in axle-piece, constructed and operating together substantially as above described.

W. H. MURPHY.

Witnesses:
C. W. SMITH,
D. C. MARKHAM.